United States Patent
Fishel et al.

(10) Patent No.: US 10,273,009 B2
(45) Date of Patent: Apr. 30, 2019

(54) TRAY TABLE WITH PERSONAL ENTERTAINMENT DEVICE HOLDER

(71) Applicant: Rockwell Collins, Inc., Cedar Rapids, IA (US)

(72) Inventors: Nathaniel Adam Fishel, Pfafftown, NC (US); Martin J. Foor, Winston-Salem, NC (US); Matteo Blanc, Winston-Salem, NC (US); Michael Kreitz, III, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 15/692,961

(22) Filed: Aug. 31, 2017

(65) Prior Publication Data
US 2019/0061953 A1    Feb. 28, 2019

(51) Int. Cl.
*B64D 11/06* (2006.01)
*A47B 23/00* (2006.01)

(52) U.S. Cl.
CPC ........ *B64D 11/0638* (2014.12); *A47B 23/001* (2013.01)

(58) Field of Classification Search
CPC ...... B60N 3/004; B64D 11/0638; A47B 31/06
USPC .................... 108/44, 152; 297/135, 163, 146
See application file for complete search history.

(56) References Cited

U.S. PATENT DOCUMENTS

| | | | | |
|---|---|---|---|---|
| 2,619,395 A | * | 11/1952 | Kent | B60N 3/004 108/38 |
| 5,443,018 A | * | 8/1995 | Cromwell | B60N 3/004 108/44 |
| 6,032,587 A | * | 3/2000 | Salenbauch | B60N 3/002 108/44 |
| 6,085,666 A | * | 7/2000 | Anderson | B60N 3/004 108/134 |
| 6,135,546 A | * | 10/2000 | Demtchouk | B60N 3/002 108/44 |
| 6,347,590 B1 | * | 2/2002 | D'Annunzio | B60N 3/002 108/25 |
| 7,281,762 B1 | * | 10/2007 | Getfield | B60N 3/004 297/163 |
| 7,506,923 B1 | | 3/2009 | Gauss | |
| 7,963,231 B2 | * | 6/2011 | Osborne | A47B 5/006 108/40 |
| 8,171,862 B2 | * | 5/2012 | Muirhead | B60N 3/002 108/152 |
| 8,596,206 B2 | * | 12/2013 | Legeay | B60N 3/002 108/137 |
| 8,665,584 B2 | | 3/2014 | Pence | |
| 8,826,830 B2 | * | 9/2014 | Pajic | A47C 7/70 108/44 |
| D766,610 S | | 9/2016 | Johnson et al. | |
| 9,573,687 B2 | | 2/2017 | Stephens et al. | |

(Continued)

*Primary Examiner* — Jose V Chen
(74) *Attorney, Agent, or Firm* — Clements Bernard Walker PLLC

(57) ABSTRACT

In an illustrative embodiment, a two-piece folding tray table includes a personal electronic device (PED) support member connected to a tray section such that, in a stowed position, the PED support member is substantially flush with the tray table. The PED support member may be deployable in both a folded tray table configuration and a side-by-side tray table configuration to support a personal electronic device at a substantially identical angle regardless of tray table use mode.

7 Claims, 17 Drawing Sheets

(56) References Cited

U.S. PATENT DOCUMENTS

| | | | |
|---|---|---|---|
| 2002/0170470 A1* | 11/2002 | Cheng | B60N 3/002 108/69 |
| 2003/0159628 A1* | 8/2003 | Salzer | A47C 7/70 108/115 |
| 2005/0178297 A1* | 8/2005 | Pipkin | A47B 23/00 108/25 |
| 2007/0283855 A1* | 12/2007 | Pozzi | A47B 23/043 108/44 |
| 2010/0109389 A1* | 5/2010 | Charpentier | B60N 3/004 297/173 |
| 2012/0325123 A1* | 12/2012 | Schoerkhuber | E05D 3/14 108/44 |
| 2015/0020715 A1* | 1/2015 | Pajic | B64D 11/00152 108/3 |
| 2015/0061327 A1* | 3/2015 | Millan | B60N 3/004 297/163 |
| 2015/0274299 A1 | 10/2015 | Henshaw et al. | |
| 2016/0039525 A1* | 2/2016 | Pajic | B64D 11/0638 108/44 |
| 2016/0059795 A1* | 3/2016 | Rook | B60N 3/004 108/25 |
| 2016/0280376 A1 | 9/2016 | Pozzi et al. | |
| 2016/0298808 A1* | 10/2016 | Boyer | F16M 13/022 |
| 2016/0355263 A1 | 12/2016 | Pozzi et al. | |
| 2017/0135468 A1* | 5/2017 | Johnson | A47B 23/02 |
| 2017/0355465 A1* | 12/2017 | Trimble | B60N 3/004 |
| 2018/0170549 A1* | 6/2018 | Jussli | B60N 3/004 |
| 2018/0244183 A1* | 8/2018 | Ruiz | B60N 3/004 |

\* cited by examiner

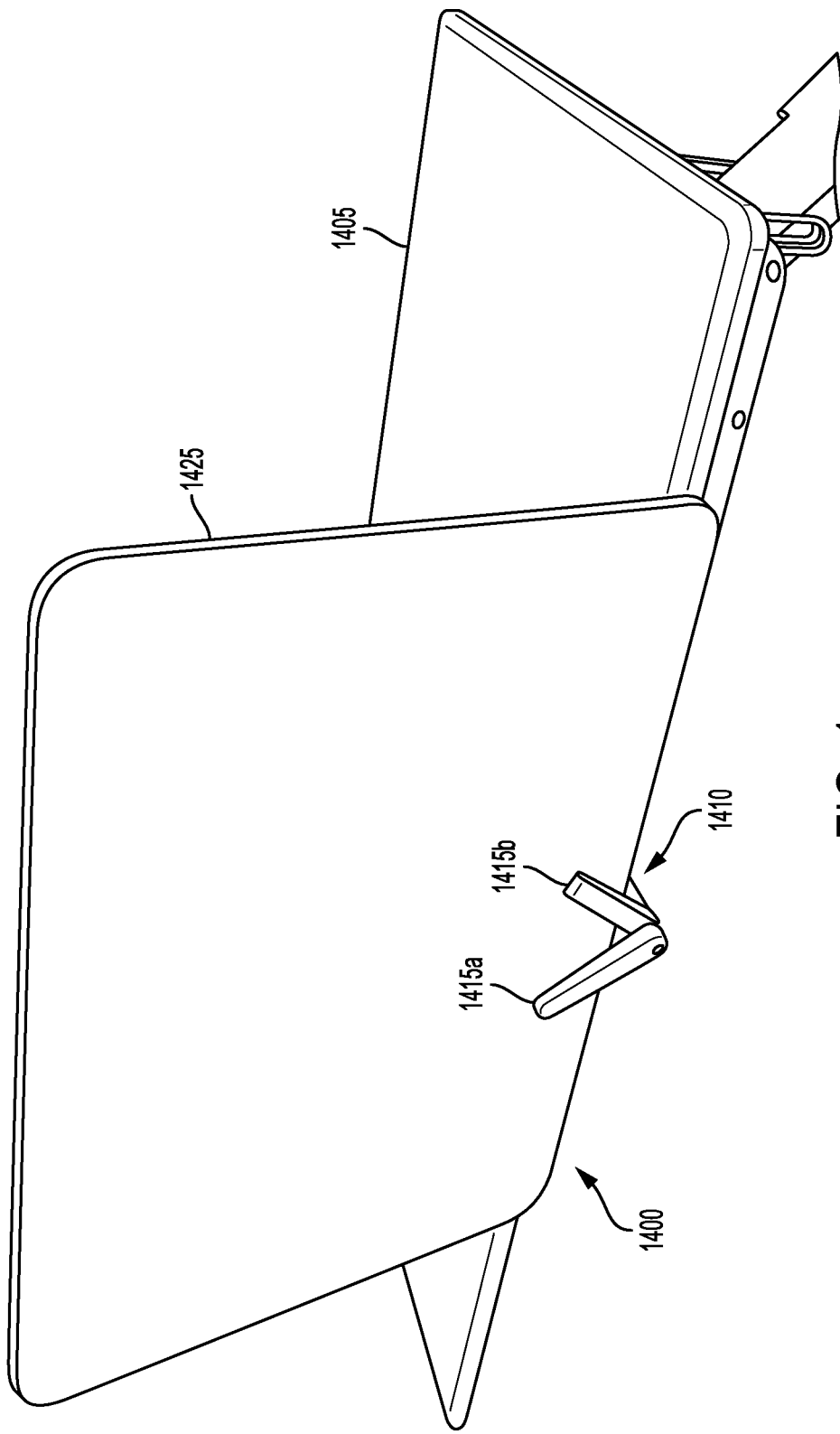

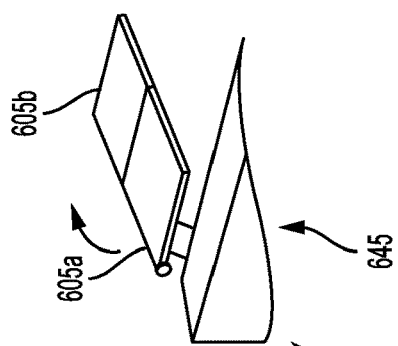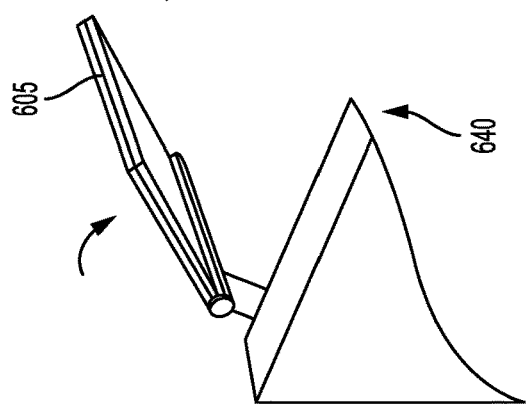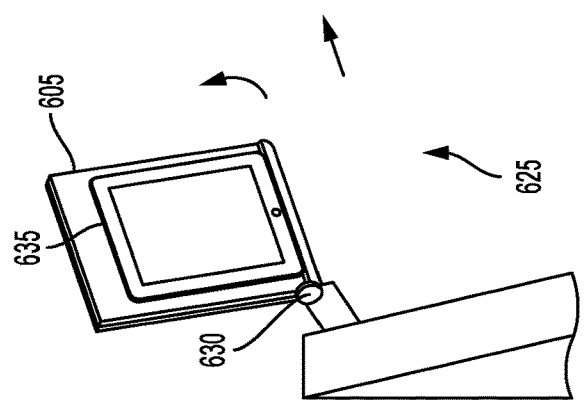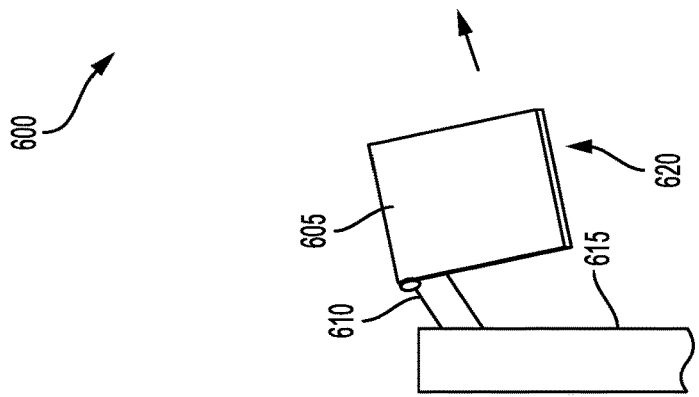

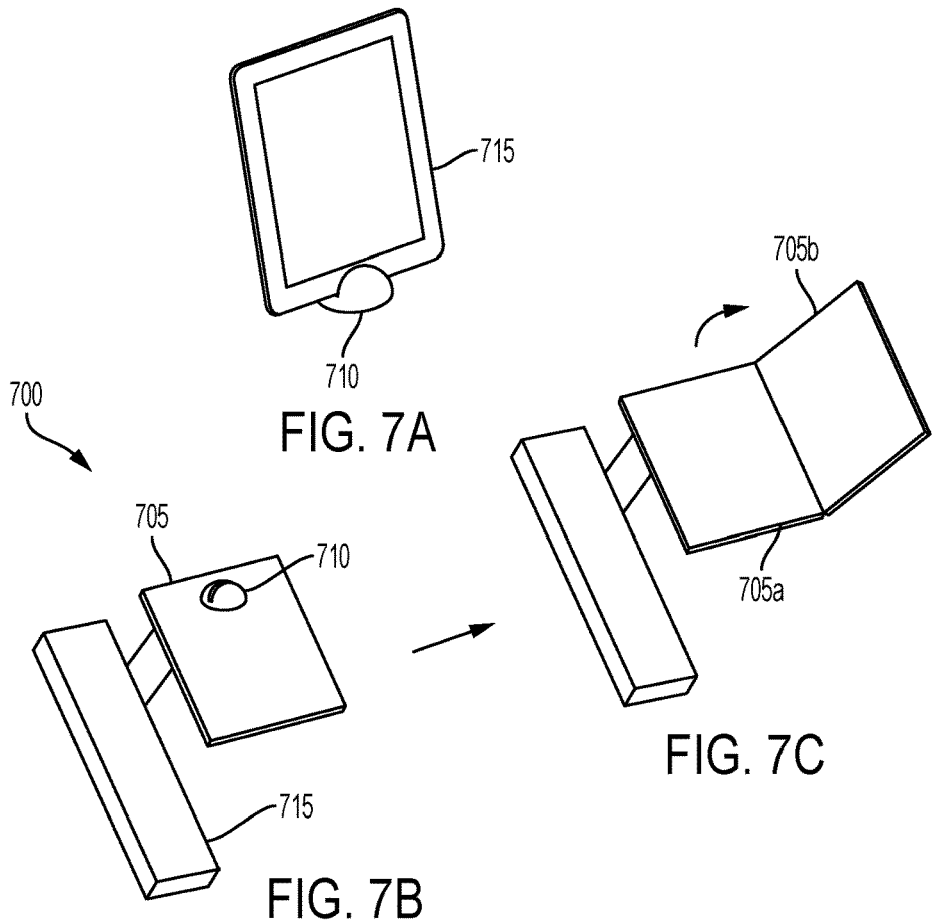
FIG. 7A
FIG. 7B
FIG. 7C
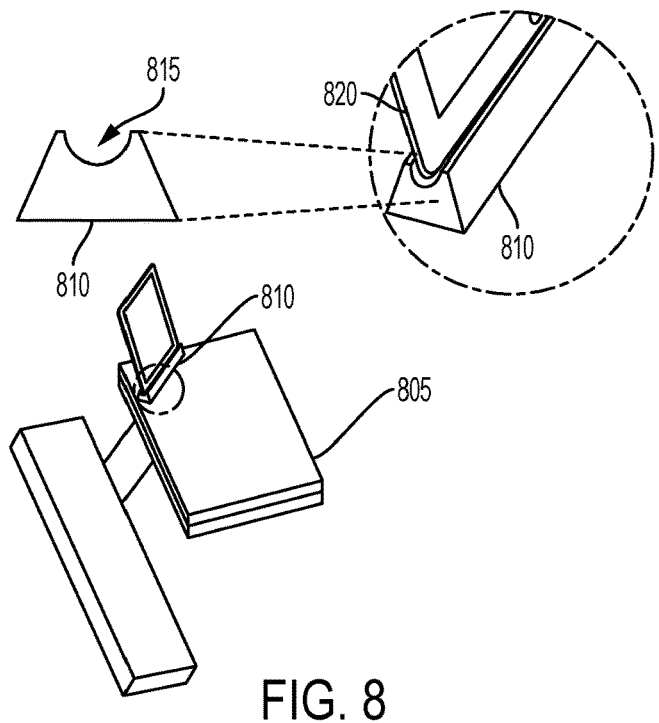
FIG. 8

TRAY TABLE WITH PERSONAL ENTERTAINMENT DEVICE HOLDER

RELATED APPLICATIONS

This application incorporates by reference, in their entirety, the following prior patent applications by B/E Aerospace, Inc. directed to personal electronic device holders for airplane passenger seats: PCT Application No. PCT/US17/20048 entitled "Tray Table with Adjustable Media Support Surface," filed Feb. 28, 2017; U.S. patent application Ser. No. 15/066,385, entitled "Seat Back Personal Electronic Device Holder," filed Mar. 10, 2016; U.S. patent application Ser. No. 15/174,242, entitled "Deployable Seatback Holder for Portable Electronic Devices," filed Jun. 6, 2016; U.S. patent application Ser. No. 14/667,133, entitled "Deployable Center Console Shelf," filed Mar. 24, 2015; U.S. Pat. No. 8,665,584 to B/E Aerospace entitled "Tablet Holder and Tablet Stowage System" and issued Mar. 4, 2014; and U.S. Design Pat. No. D766,610S entitled "Passenger Tray Table," issued Sep. 20, 2016. Further, this application incorporates by reference, in their entireties, U.S. Pat. No. 7,506,923 to B/E Aerospace entitled "Adjustable Bi-Fold Tray Table" and issued Mar. 24, 2009, and U.S. Pat. No. 9,573,687 to B/E Aerospace entitled "Laterally-Expanding Tray Table" and issued Feb. 21, 2017, each of which describes tray table mounting apparatus.

BACKGROUND

Conventional tray tables typically extend the width of a seat back, and are moveable between a stowed position flush with and latched to the seat back of a seat and a deployed position with the tray table extending away from the seat back in a generally horizontal position for use by an aft-seated occupant. Other well-known designs include bi-fold tray tables that are hinged in the middle and are typically stowed in a folded configuration in an armrest. To deploy the table, the arm cap is raised, the table pivoted out of a storage cavity in the armrest, pivoted laterally across the lap of the seat occupant, after which the table is unfolded at the hinge to form a full width tray table.

Electronic media devices, such as tablet computers, smart phones, handheld gaming devices, e-readers, and other portable electronic devices (PEDs) are becoming more commonplace due to the increased needs for portable computing, remote communication and access to media content. The use of electronic media devices has increased substantially since the Federal Aviation Administration liberalized the use of portable electronic devices such as laptop computers, tablets, and phones during most phases of aircraft flight.

While designed to be easily held for touchscreen use, most PEDs lack a mounting structure or structure to mount thereto to securely maintain the device for prolonged use or for hands-free interaction. This is particularly disadvantageous when using a PED in a vehicle such as an airplane, train or car where the PED may be used, in part, as a replacement for a permanently-mounted dedicated video monitor.

There is a need for a more secure manner of holding the devices in a use position while minimizing the possibility of the device falling onto the aircraft deck or into space occupied by another passenger. For this reason, the tray table of this application includes features intended to more securely hold portable electronic devices during use, while also providing for additional uses of the tray table, such as for holding a meal tray or a beverage cup.

SUMMARY OF ILLUSTRATIVE EMBODIMENTS

Apparatus and associated methods relate to an in-arm-tray Personal Entertainment Device (PED) support member affixed to a meal tray table. Personal entertainment devices, in some examples, may include a tablet computer, smart phone, e-reader, music player, video game unit, or other handheld electronic device. In further examples, personal entertainment devices may include books, magazines, or notepads.

The PED support member design may facilitate deployment in at least a reading angle and a media viewing angle. In some embodiments, the PED support member provides for an infinitely adjustable PED viewing angle. The PED support member may include a frictionally-retaining non-skid surface, and may allow lateral PED movement. In an illustrative example, a passenger may advantageously view a PED at an acceptable viewing angle without holding the PED in their hands. In some embodiments, two passengers may view a PED simultaneously.

The PED support member, in some embodiments, is deployable for use in both a folded tray table configuration (e.g., when a first tray section is folded atop a second tray section) and an open tray table configuration (e.g., when the first tray section is in-line with the second tray section). For example, the PED support member may be designed to pivot in a range of at least 270 degrees to provide for a same angle of deployment relative to the work surface of the tray table whether the tray table is folded and open.

Various embodiments may achieve one or more advantages. For example, some embodiments may facilitate tray retrofitting and/or replacement, for airlines upgrading to a PED holder tray table. Some embodiments may, for example, stow in a compact form factor inside of a tray table. By securely supporting a PED at a comfortable viewing angle, various embodiments may promote more productive travel time experiences, for example, during a flight. Some examples may also permit a passenger to receive a meal tray without interrupting access to the PED.

The forgoing general description of the illustrative implementations and the following detailed description thereof are merely exemplary aspects of the teachings of this disclosure, and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 1 depicts a perspective view of an exemplary PED holder tray table employed with posterior articulating fingers;

FIGS. 6A-6D depict the foldout states of an exemplary folding PED holder tray table according to a further embodiment;

FIGS. 7A-7C depict an exemplary PED holder tray table with a pivoting PED holder;

FIG. 8 depicts an exemplary PED holder tray table with a fixed blade holder;

DETAILED DESCRIPTION OF ILLUSTRATIVE EMBODIMENTS

Figure 2A:
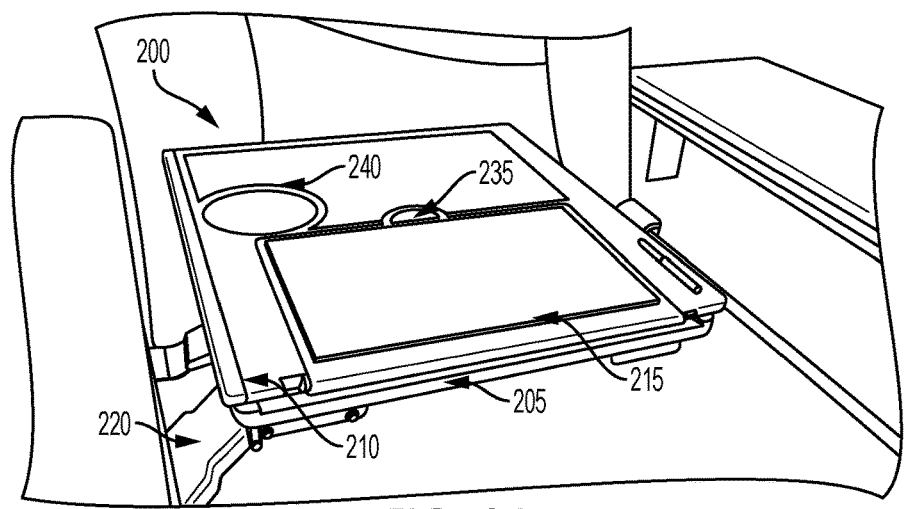
FIGS. 2A-2C depicts an exemplary folding PED holder tray table.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Generally, in accordance with this disclosure, personal entertainment device (PED) holders for aircraft passenger tray tables may include one or more deployable supports for propping a personal entertainment device, such as a tablet computer, smart phone, e-reader, music player, video game unit, or other handheld electronic device. In further examples, personal entertainment devices may include books, magazines, or notepads. Additionally, personal entertainment device (PED) holders for aircraft passenger tray tables may include one or more retention mechanisms for retaining the PED in position against the deployable support(s).

Generally, a PED holder tray table may include a primary table section hingedly coupled to an extension table section such that the extension table section may fold atop the primary table section.

FIG. 1 depicts a perspective view of an exemplary PED holder tray table 1400 having articulating support fingers. A PED holder tray table 1400 includes a table section 1405 slidably coupled to a shaft 1410. The shaft 1410 is hingedly coupled to an inner PED support finger 1415a and to an outer PED support finger 1415b. When stowed, the support fingers 1415 may be rotated to a linear position parallel with the back edge of the table section 1405, then pushed in until abutting the edge of the table section 1405. In an illustrative example, a passenger may deploy the articulating support fingers 1415 by pushing the support fingers 1415 away from himself or herself, thus extending the shaft 1410 from the stowed position in the table section 1405. The passenger may then rotate the support fingers 1415 upward into the "V" configuration illustrated in FIG. 1. As illustrated, a PED 1425 may rest on the shaft 1410 while the support fingers 1415 engage the PED 1425 against the edge of the table section 1405. In some embodiments, a stabilizer ledge may be disposed horizontally on both sides of the shaft 1410 along the far edge of the tray table 1405 (with respect to a seated passenger) which may provide lateral stability to the PED 1425.

Figure 2B:
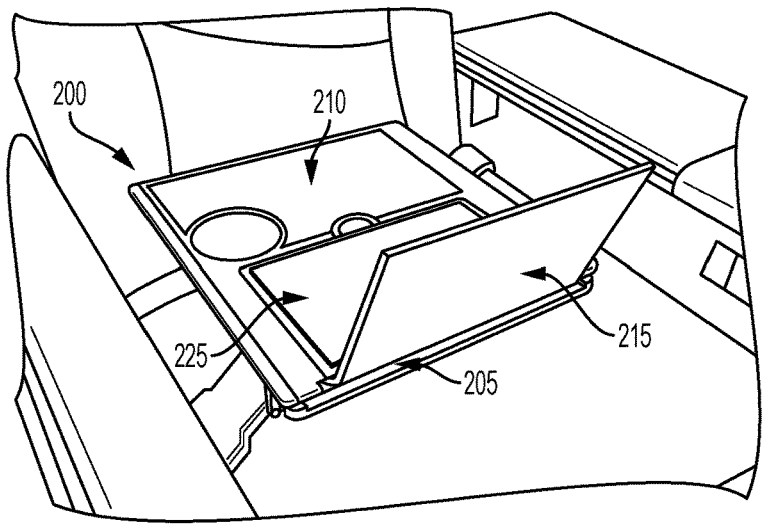
Figure 2C:
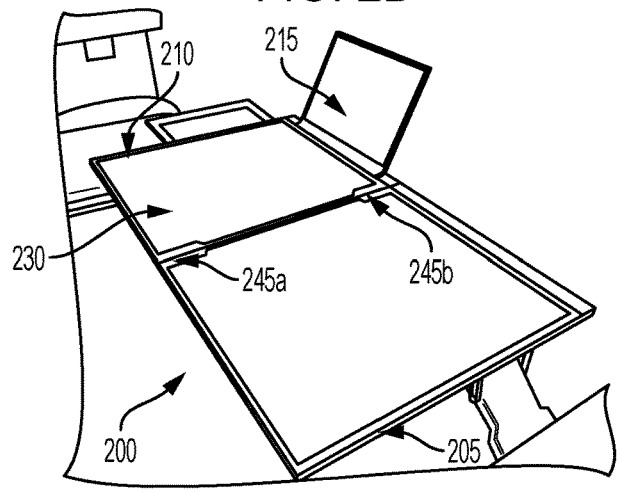

FIGS. 2A through 2C depict an exemplary folding PED holder tray table 200 including a deployable support structure usable in both the folded and unfolded tray state. The PED holder tray table 200 may be swivelably coupled to a passenger tray mounting bracket 220, allowing, for example, arm rest deployment of the PED holder tray table 200. In some examples, the PED holder tray table 200A swivel coupling may facilitate the PED holder tray table 200 field retrofit. In some examples, the PED holder tray table 200 swivel coupling may facilitate replacement of a PED holder tray table 200. The swivel coupling, for example, may allow the PED holder tray table 200 to be rotated away from the passenger, for example allowing the passenger to gain space to exit the passenger seat without stowing the PED holder tray table 200. In some examples, the swivel coupling may be capable of rotating at least 90 degrees, up to 135 degrees, or up to 180 degrees to allow for passenger egress during tray table deployment. In other embodiments, the folding PED holder tray table 200 may be designed to deploy from a mounting position upon a seat back of the fore positioned passenger seat.

Turning to FIG. 2A, the PED holder tray table 200 is illustrated in a partially deployed (folded) state. The PED holder tray table 200 includes a primary table section 205 hingedly coupled to an extension table section 210, where the primary table section 205, in the partially deployed state, is beneath the extension table section 210. The extension table section 210 is hingedly coupled to a PED backrest 215.

The PED holder tray table 200, in some implementations, includes a beverage retention mechanism 240. The beverage retention mechanism 240, in one example, may include a raised lip relative to a horizontal surface of the extension table section 210. In another example, the beverage retention mechanism 240 includes a depression relative to the horizontal surface of the extension table section 210. As illustrated, the beverage retention mechanism 240 is generally circular in shape. Although illustrated as being provided upon a bottom surface of the extension table section 210 (e.g., accessible to the passenger while the PED holder tray table 200 is in a folded configuration), in some implementations, the PED holder tray table 200 includes an additional or alternative beverage retention mechanism disposed upon a top surface of one of the primary table section 205 and the extension table section 210.

The PED backrest 215, in the partially deployed state of FIG. 2A, rests against the extension table section 210 in a stowed position. The extension table section 210, for example, may include a depression configured to receive the PED backrest 215, allowing for the extension table section 210 to remain significantly flat while the PED backrest 215 is in the stowed position. To deploy the PED backrest 215, for example, the user may pull the PED backrest 215 away from the extension table section 210, using a finger depression 235 to gain purchase of the edge of the PED backrest 215. In other embodiments, the PED backrest 215 may be deployable through an actuable release mechanism, such as a release button mounted to an edge of the extension table section 210. In a further example, the PED backrest 215 may be lifted away from the surface of the extension table section 210 by deploying a retention mechanism positioned on a surface of the extension table section 210 beneath the PED backrest 215. Slip stop ridge(s) may alternatively be deployable from the surface of the compartment, providing the opportunity for a user to gain purchase beneath the compartment cover. The slip stop ridge(s), for example, may be rotatable into position or spring released/retracted. The slip stop ridge(s) may be formed, in one example, as columnar "speed bumps" along a surface of the compartment 225 parallel to the PED such that the PED may rest upon a selected "speed bump" to select a viewing angle. Alternatively, the slip stop ridge(s) may be triangular or rectangular (e.g., allowing the flat edge to lay flush with the surface of the compartment 225 when not in a deployed position).

Turning to FIG. 2B, the PED holder tray table 200 is illustrated in the partially deployed state with a deployed PED backrest 215. The primary table section 205 of the PED holder tray table 200 remains folded beneath the extension table section 210. The PED backrest 215 is now rotated upwards in to a deployed state, having a pivoting connection at the edge of the extension table section 210 rotated so that the PED backrest 215 is open to approximately 115 degrees from the stowed position. The pivoting connection, for example, may include a friction hinge for adjusting an angle of the PED backrest 215 relative to the surface of the extension table section 210. In another example, the pivoting connection may include a detent hinge for releasably setting one or more angles of deployment of the PED backrest 215. For example, a detent hinge may provide selectable settings for at least two separate angles (e.g., a video viewing angle and a reading angle). The pivoting connection may include a constant torque adjustment such that vibrations, turbulence, and/or dynamic loads caused by passenger interaction with the PED do not cause migration of positioning. The static load capability of the PED backrest 215, for example, may be at least 3 pounds, at least 5 pounds, or up to 10 pounds.

The extension table section 210, in some implementations, includes a PED retaining surface treatment 225 disposed beneath the PED backrest 215 when in stowed state. In an illustrative example, a passenger may advantageously rest a PED on the PED backrest 215, and find benefit with the PED retaining surface treatment 225 holding the PED upright. In one example, the PED retaining surface treatment 225 may include one or more protrusions (e.g., "speed bumps") which function similar to the slip-stop ridge(s) 130 described in relation to FIG. 2B. In some examples, the speed bumps may be rounded, designed as a series of raised bumps, or series of protrusions that are flat on the side facing the PED and rounded on the opposing side.

In another example, the PED retaining surface treatment 225 may be roughened or textured (e.g., a bumpy or otherwise "sandpapery" surface) to encourage engagement with a lower edge of a PED. In a further example, the PED retaining surface treatment 225 may include a surface treatment or overlay with a gripping substance. For example, a rubberized or tacky surface material may be provided upon a portion of the extension table section 210 to retain PEDs during turbulence or while in angled deployment. Additionally, in some embodiments, the PED backrest 215 includes a PED retaining surface treatment upon at least a portion of the surface facing a PED. For example, a PED retaining surface treatment such as the slip resistant surface options described in relation to the extension table section 210 may be applied to the PED backrest 215.

Turning to FIG. 2C, the PED holder tray table 200 is illustrated in a fully open state with the PED backrest 215 deployed in a second deployed position. The PED holder tray table 200, in fully deployed (unfolded) position, includes the primary table section 205 adjacent to the extension table section 210. A set of hinges 245a, 245b connecting the primary table section 205 to the extension table section 210 may be position hinges designed to hold the weight of the PED holder tray table 200 as well as one or more PEDs such as a tablet computing device in addition to a beverage, and/or a meal tray. For example, the hinges 245a, 245b may be designed to hold a combined weight set atop of the PED holder tray table 200 of at least 10 pounds, between 10 and 15 pounds, or greater than 15 pounds. The PED holder tray table 200, in the open position, may include an additional locking mechanism to accept loads placed upon the PED holder tray table 200 and to remove stress from the hinges 245*a*, 245*b*.

Additionally, in the fully open state, the PED backrest 215 is deployed facing the opposite side of the extension table section 210 than the deployed position of FIG. 2B. In some embodiments, the PED backrest may hinge at least 210°, at least 225°, up to 270° or up to 360°, such that it may be used with the top or the bottom surfaces of the extension table section 210. The pivoting connection, for example, may include a friction hinge for adjusting an angle of the PED backrest 215 relative to the surface of the extension table section 210 such that the PED backrest 215 may be deployed at a universally-selectable angle relative to either the upper surface of the extension table section 210 or the lower surface of the extension table section 210, depending upon positioning of the PED holder tray table 200. In another example, the pivoting connection may include a detent hinge for releasably setting one or more angles of deployment of the PED backrest 215 relative to either side of the extension table section 210. For example, a detent hinge may provide selectable settings for at least two separate angles (e.g., a video viewing angle and a reading angle) per side of the extension table section 210.

In some embodiments, a portion of the upper surface of the extension table section 210 includes a PED retaining surface treatment 230. In an illustrative example, a passenger may advantageously rest a PED on the PED backrest 215 and find benefit with the PED retaining surface treatment 230 holding the PED upright. For example, a PED retaining surface treatment such as the slip resistant surface options described in relation to the extension table section 210 may be applied to the upper surface of the extension table section 210. Further, the opposing surface of the PED backrest 215 (e.g., the surface facing the passenger in the fully deployed position of FIG. 2C as opposed to the surface facing the passenger in the folded position of FIG. 2B) may include a PED retaining surface treatment such as the slip resistant surface options described in relation to the PED retaining surface treatment 225 of FIG. 2B.

From the deployed position illustrated in FIG. 2C, in some implementations, the PED backrest 215 may be rotated around to align with the PED retaining surface treatment region 225, now oriented underneath the fully deployed PED holder tray table 200. Alternatively, in configurations including a 360° pivoting mechanism, the extension surface 210 may include a receiving region (not illustrated), such as a recessed portion of the upper surface of the extension surface 210, to receive the PED backrest 215.

Figure 3A:
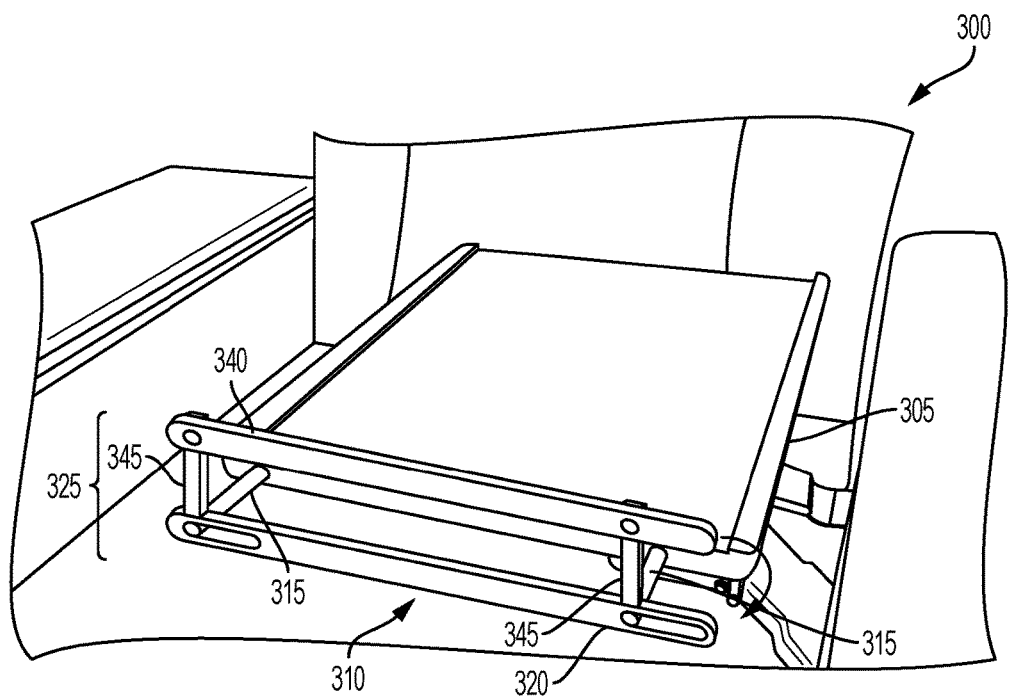
FIGS. 3A and 3B depict an exemplary PED holder tray table according to an embodiment.
Figure 3B:
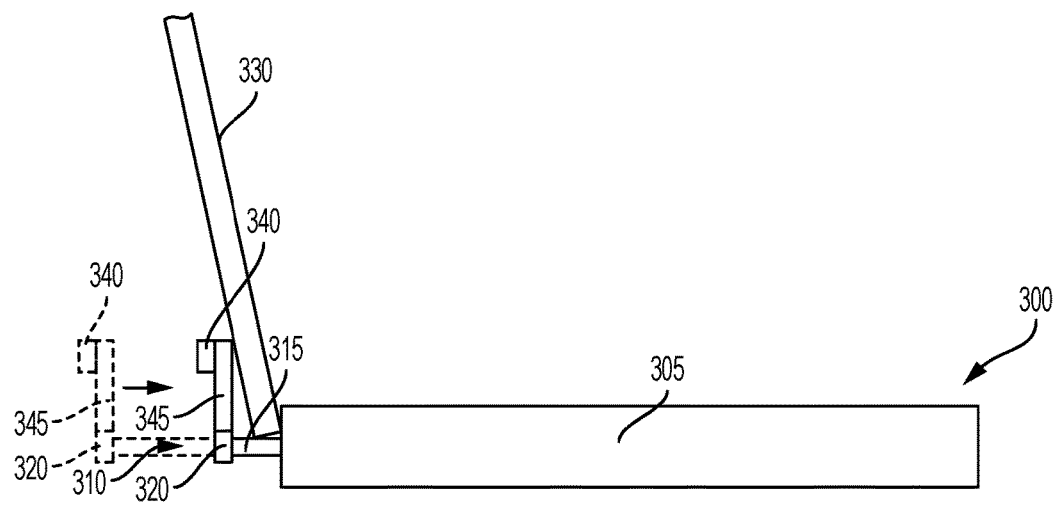

FIGS. 3A through 3C depict an exemplary PED holder tray table 300 with a slide-out PED support mechanism. Turning to FIG. 3A, the PED holder tray table 300 includes a table section 305, which may represent the entire table surface or a section of a bi-folding tray table such as the tray tables illustrated in FIGS. 1 and 2A through 2C. The table section 305 is configured to slidably stow a PED support apparatus 310. The PED support apparatus 310 may include at least one arm 315 (illustrated as two arms 315) at least partially extendable from an interior pocket of the table section 305. The arm(s) 315, for example, may be coupled to a PED support member base 320.

The PED support member base 320, in some embodiments, is rotatably coupled to a PED support member 325. As illustrated, the PED support member 325 includes a backrest portion 340 and extension linkages 345. The extension linkages are designed to rotatably stow the backrest portion 340 in substantial alignment with the PED support member base 320. For example, the backrest portion 340 may align with an outer surface of the PED support member base 320. In another example, the backrest portion 340 may be stowable within a pocket region of the PED support member base 320.

In some implementations, as illustrated in FIG. 3B, in the stowed position in which the backrest portion 340 is stowed within the pocket region, the PED support apparatus 310 may align with the table section 305 in a manner reminiscent to a DVD tray stowed within a laptop computer. To deploy the PED support apparatus 310, in the example corresponding to a DVD tray, a spring release apparatus may be used to overcome a detent through the passenger pressing against the backrest portion 430 and releasing. In another example, a bottom of the PED support apparatus 310 may include a depression or lip allowing a passenger to gain purchase of the PED support apparatus 310 and manually pull the PED support apparatus 310 into deployed position.

As illustrated in a side view in FIG. 3C, during deployment, a PED 330 may rest on the arm(s) 315 and lean against the support member 325 which may advantageously facilitate use of the PED 330 by a passenger. To adjust an angle of the PED 330, for example, the passenger may selectably extend the arm(s) 315 away from the table section 305. In some examples, the arm(s) 315 may be extendable to create an adjustable gap between the table section 305 and the backrest portion 340 of up to 1 inch, up to two inches, up to three inches, or over four inches. The arm(s) 315 may be frictionally engaged with interior members of the table section 305, for example, to control deployment and maintain positioning of the backrest member 340 in deployed position. In another example, the arm(s) 315 may include notches or protrusions configured to mate with interior members of the table section 305, creating a series of engagement positions controlling the extension of the arm(s) 315.

Although illustrated as rotating linkages 345 that rotate from a horizontal, stowed position to a vertical, upright position, in other embodiments, the linkages 345 may scissor fold into stowed position. In this manner, for example, the backrest portion 340 would remain vertically aligned with the support base 320.

Figure 4A:
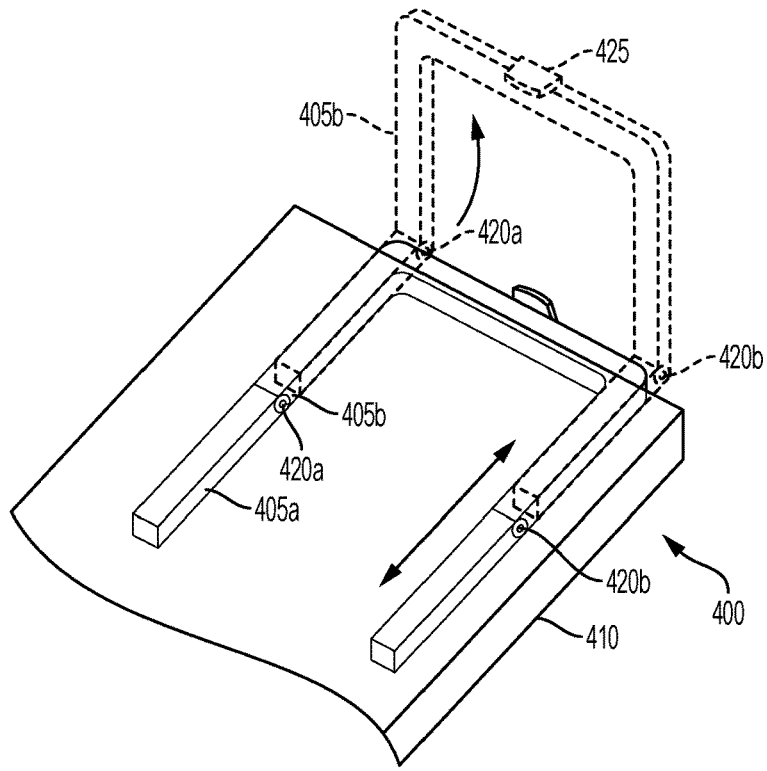
FIGS. 4A-4C depict an exemplary PED holder tray table with a slide-out in-tray PED holder according to another embodiment.
Figure 4B:
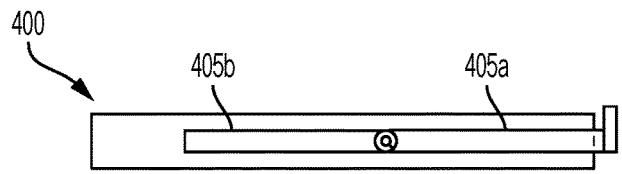
Figure 4C:
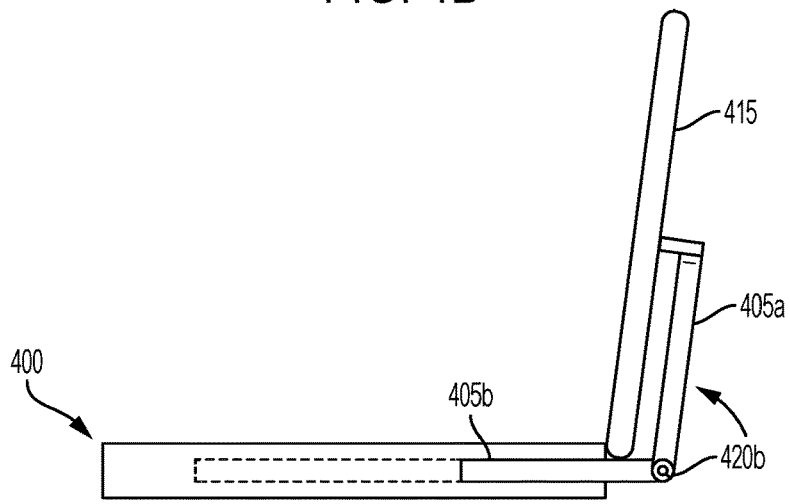

FIGS. 4A through 4C depict an exemplary PED holder tray table 400 including a slide-out PED holder according to a further embodiment. A table section 410 is slidably coupled to a hinging support bracket 405 including extension arm portions 405*a* and a support member portion 405*b*. In some embodiments, when the support bracket 405 is stowed, the extension arm portions 405 are collinear with the support member portion 405*b*. When deployed (e.g., at least to a point where hinges 420 clear the edge of the table section 410), the support member portion 405*b* swings hingedly upward to hold a PED.

In some embodiments, a passenger pushes a tab section 425 outwardly to begin deployment. For example, as illustrated in FIG. 4B, the tab section 425 of the support member portion 405*b* may extend upward beyond the horizontal surface of the table portion 410. In some implementations, the passenger then pulls upwardly at the tab 425 or other section of the support member portion 405*b* to deploy the support member portion 405*b* vertically into, for example, a position illustrated in FIG. 4C. For example, the hinges 420 may be friction hinges or detent hinges for selectably deploying the support member 405*b*. In other implementations, the hinges 420 automatically deploy upon the hinges 420 clearing the edge of the table section 410. For example, at least one of the hinges 420 may be a coiled spring hinge configured to bias the support member portion 405*b* upward toward the upright, deployed position. The coiled spring hinge, for example, may be designed to support a load of a PED such as, in some examples, up to one pound, up to three pounds, or over 5 pounds. However, the coiled spring hinge may include only a single deployment angle. If, instead, a friction hinge or detent hinge mechanism is used, the distance of extension of the extension arms 405*a* outside the tray table section 410 may be reduced. For example, allowing for a tilt in the support member portion 405*b* may allow for a reduced gap between the bottom of the support member portion 405*b* and the tray table portion 410. This may be desirable in tight quarters, such as in economy class where the fore positioned passenger seat is close to the passenger seat. To return the support bracket 405 to the stowed position, the passenger may press agains the support member 405*b* to overcome the torque of the friction spring or the spring force of the coiled spring, for example, to return the support member portion 405*b* to its horizontal position in line with the extension arm portions and push the support bracket 405 inward toward the tray table section 410.

Figure 5A:
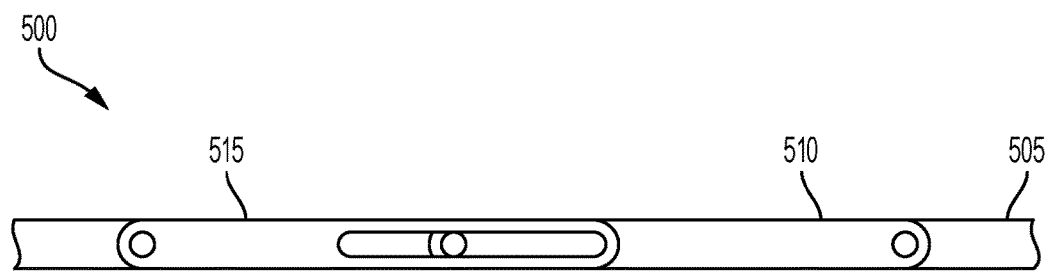
FIGS. 5A and 5B depict an exemplary PED holder tray table.
Figure 5B:
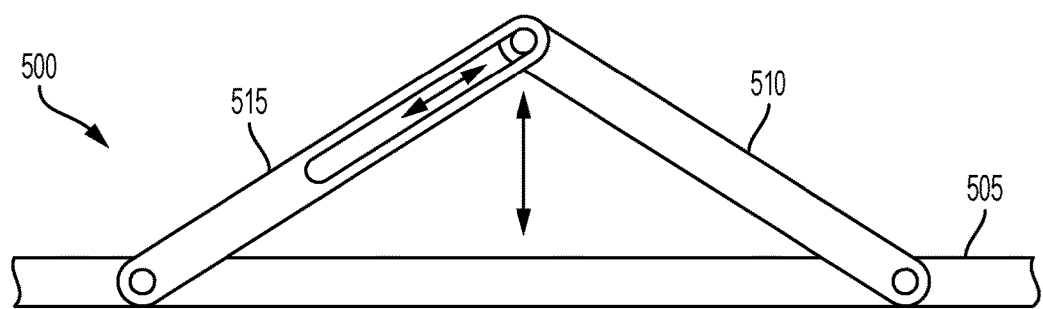

FIGS. 5A and 5B depict an exemplary PED holder tray table 500 including a table section 505 and a PED backrest 510 hingedly coupled thereto. The PED backrest 510 is slidably coupled to a support member 515. The support member is hingedly coupled to the tray table 505. In some embodiments, the PED backrest 510 may hinge upward, sliding within the support member 515, creating a structure in which the passenger may place a PED. In some examples, the PED backrest 510 and support member 514 may stow in a folded down state, as depicted in FIG. 5A. In some examples, the PED backrest 510 and support member 514 may be hingedly coupled to a lateral edge of the tray table 505.

FIGS. 6A-D depict a foldout PED holder tray table apparatus 600 having a primary table section 605*a* hingedly coupled to a bracket 610 which, in turn, is hingedly coupled to a passenger seat support such as an armrest 615. The primary table section 605*a* is further hingedly coupled to an extension table section 606*b*.

Turning to FIG. 6A, the tray table apparatus is in a first (folded) position 620, for example after being pulled out of the armrest 615. In the first position, the extension table section 605*b* may be folded atop the primary table section 605*a*.

The first position 620 is advanced to a second position 625, shown in FIG. 6B, by rotating the tray table 605 up and back away from a passenger via a rotating hinge 630. In this position, the primary table section 605*b* faces the passenger, and a ledge for retaining a PED 635 is presented for use. In some embodiments, the hinge 630 may be continuously adjusted which may advantageously provide continuous viewing angle adjustment of the PED 635. In some examples, the rotating hinge 630 may provide a range of motion from the horizontal position 620 illustrated in FIG. 6A to the PED use position 625 illustrated in FIG. 6B of at least 105 degrees, at least 130 degrees, or up to 180 degrees.

As illustrated in FIG. 6C, the second position 625 may be advanced to a third position 640 where the tray table 605 is hinged downward and toward the passenger (e.g., returning to the state of the first position 620 of FIG. 6A). Continuing from the first position 620 of FIG. 6A, the tray table 605 may be advanced to a fourth state 645, illustrated in FIG. 6D, where the tray table 605 is unfolded and flipped laterally for full tray extension. In the position 645, the primary table section 605*a* is adjacent to and horizontally in line with the extension table section 605*b*.

FIGS. 7A-C depict an exemplary PED holder tray table 700 including a pivoting PED holder 710. In some embodiments, the PED holder 710 may be hemisphere-shaped, and the shape may incorporate a slot (shown in FIG. 7B), configured to hold a PED 715 at an advantageously angled position. In some embodiments, as illustrated in FIG. 7B, the hemisphere-shaped PED holder 710 may rotate within a horizontal plane, parallel to a table section 705 which may advantageously adjust the PED 715 to a passenger's viewing preferences. In some examples, the hemisphere-shaped PED holder 710 may rock up and down, normal to the tray table 705, which may advantageously adjust the PED 715 to a passenger's viewing angle.

In some embodiments, the slot of the pivoting PED holder 710 rotates backward from a position perpendicular with the horizontal plane of a table section to provide for ease of PED use. For example, range of motion may be at least 30 degrees from normal, at least 45 degrees from normal, or up to 90 degrees from normal.

In some embodiments, at least one surface of the PED holder 710 is substantially flat such that the PED holder 710 may rotate into the table section 705 and provide the user with a substantially flat surface. For example, an indentation may provide the user purchase to rotate the PED holder 710 from its stowed position. For example, range of motion may be at least +90 degrees (or −90 degrees) from normal, from −90 degrees to at least 30 degrees from normal, or between −90 and +90 degrees from normal.

As illustrated in FIG. 7C, in some implementations, the PED holder 710 is mounted in an extension section 705*b* of a folding tray table 705. For example, the PED holder 710 may only be accessible from a bottom surface of the extension section 705*b* while the tray table 705 is in a folded position. In other implementations, the PED holder 710 extends through a depth of the extension table section 705*b*, providing access to the PED holder 710 whether the tray table 705 is in folded or extended position. For example, the PED holder 710 may be designed to revolve such that the slot is angled at least 30 degrees from normal away from the passenger whether the slot is extending from a top surface of the extension table section 705*b* or a bottom surface of the extension table section 705*b*.

In some implementations, in addition to pivoting movement, the PED holder 710 is designed to provide rotational movement. For example, the PED holder 710 may be capable of rotating in a horizontal plane of the extension table section 705*b* such that the PED 715 and the slot are offset from a centerline of the extension table section 705*b*. The PED holder 710 may have a rotational range, in some examples, of at least 15 degrees, at least 30 degrees, or up to 90 degrees.

Although illustrated as being connected to an arm rest 720, in other embodiments, the tray table 700 may be mounted to a seatback of the fore passenger seat.

FIG. 8 depicts an exemplary PED holder tray table 800 with a fixed blade holder 810. The PED holder 810, for example, may be shaped as a triangular prism with an incorporated trough 815 employed to hold a PED 820. The PED holder 810 may be mounted to a top surface of a table section 805, for example angled toward a seated passenger. In some examples, the PED holder 810 may be mounted at about a 15 degree angle, 20 degree angle, or up to a 30 degree angle offset from a horizontal centerline of the table section 805. The PED holder 810 may be mounted to a bottom surface of an extension table section of a bi-folding table, such that, during meal time, the PED holder 810 does not interfere with a meal tray. Conversely, the PED holder 810 may be designed to rotate upward out of the surface of the table section 805, such that it may be stowed to provide a substantially flat surface to receive items such as a laptop computer, meal tray, briefcase, etc.

To securely retain the PED 820, in some implementations, the trough 815 may include depressable material such as a foam material to contract against the pressure of the inserted PED 820 and hold against the PED 820. In other implementations, the trough 815 may include a PED retention treatment, such as a non-slip surface treatment as discussed in more detail above in relation to FIG. 2B.

Figure 9A:
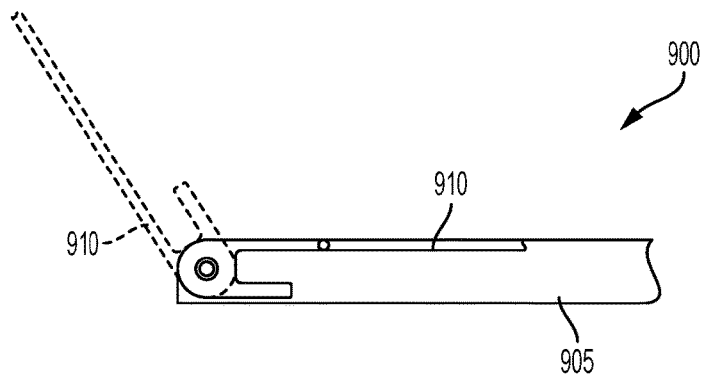
FIGS. 9A and 9B depict an exemplary PED holder tray table with a pivot-out in-tray PED holder.
Figure 9B:
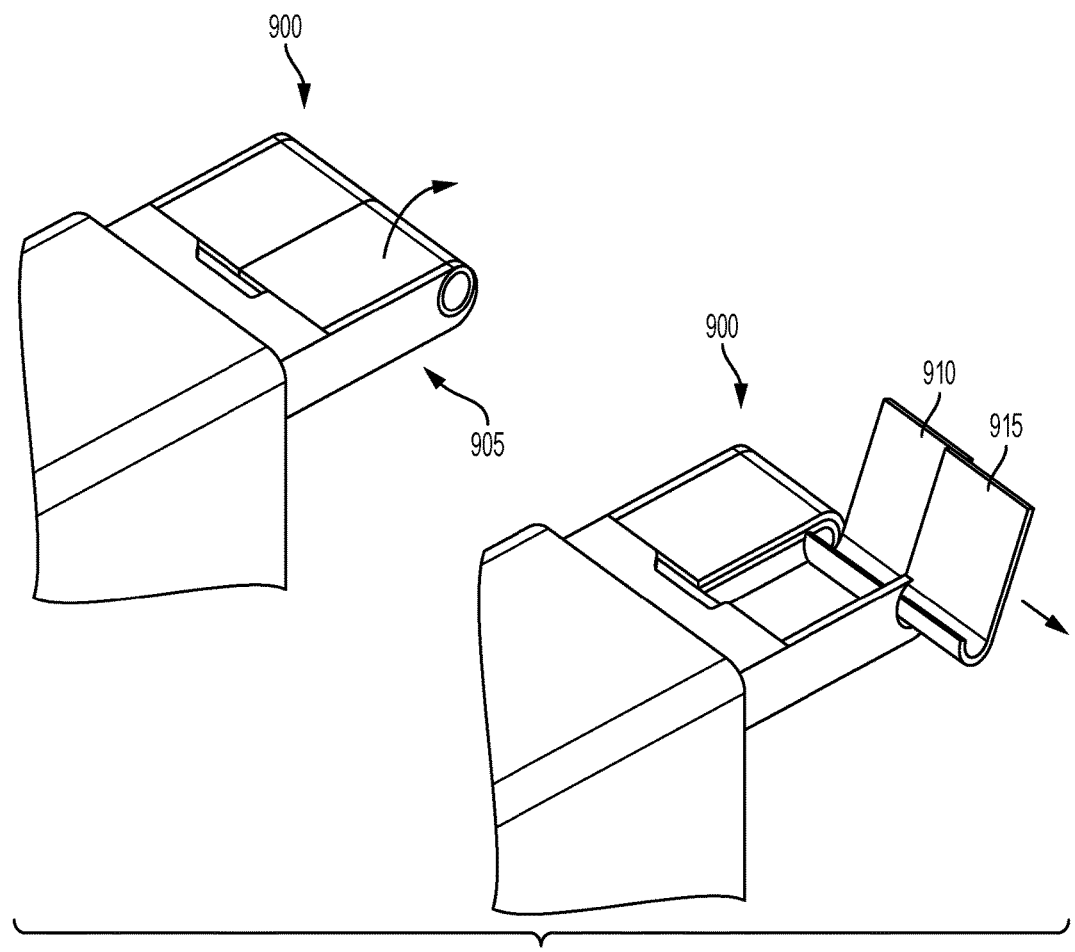

FIGS. 9A and 9B depict an exemplary PED holder tray table 900 including a pivoting PED holder 910. The pivoting PED holder 910 is hingedly coupled to a table section 905. In some embodiments, the hinged coupling facilitates a continuously adjustable viewing angle when the PED is positioned in the pivoting PED holder 910. For example, the hinge may be a friction hinge providing for a universally adjustable viewing angle over at least a certain range. The range, from a horizontal surface of the table section 905, may be at least 100 degrees, at least 130 degrees, or up to 180 degrees. The limit of the range of motion, in some embodiments, is provided by a surface feature at a base of the PED holder 910 which abuts an edge of the table section 905 to prevent additional rotation. In other embodiments, the hinged coupling facilitates stepped positioning. For example, a detent hinge may provide two or more selectable positions, such as a reading position and a video viewing position.

The table section 905 provides a stowage groove to stow the pivoting PED holder 910 such that, in a stowed position, the PED holder 910 lies substantially flush with a surface of the table section 905. In some embodiments, the PED holder 910 includes a tab or depression configured to allow the passenger to grasp a portion of the PED holder 910 and manually rotate the PED holder 910 into deployed position. may stow the pivoting PED holder 910 in such a manner that it is flush with the surface of the table portion 905. In other embodiments, a knob on the side of the table section 905 is used to rotate the PED holder 910 upward from stowed position.

Turning to FIG. 9B, in some implementations, the PED holder 910 is slidably engaged with an extension holder 915. The extension holder 915, in some embodiments, may advantageously provide a wider PED backrest. The extension holder 915, for example, may nest with the PED holder 910 when in the stowed position.

In other embodiments, rather than an extension holder 915, the PED holder 910 may be laterally positionable between a first position along an edge of the table section 905 to a second position extending from a corner from the table section 905 through an extension mechanism coupled to a bottom section of the PED holder 910. For example, in circumstances where the tray table 900 is a bi-folding tray table deployable from a passenger seat armrest, to position the PED in front of the passenger, the passenger may relocate the PED holder 90 to the position marked 915 (e.g., extension holder) in FIG. 9B.

Although described in relation to a tray table, in other implementations, the pivoting PED holder 910 may be mounted at an end of an arm rest of the passenger seat, for example to provide a small PED holder 910 to accept, in some examples, a smart phone or e-reader.

Figure 10:
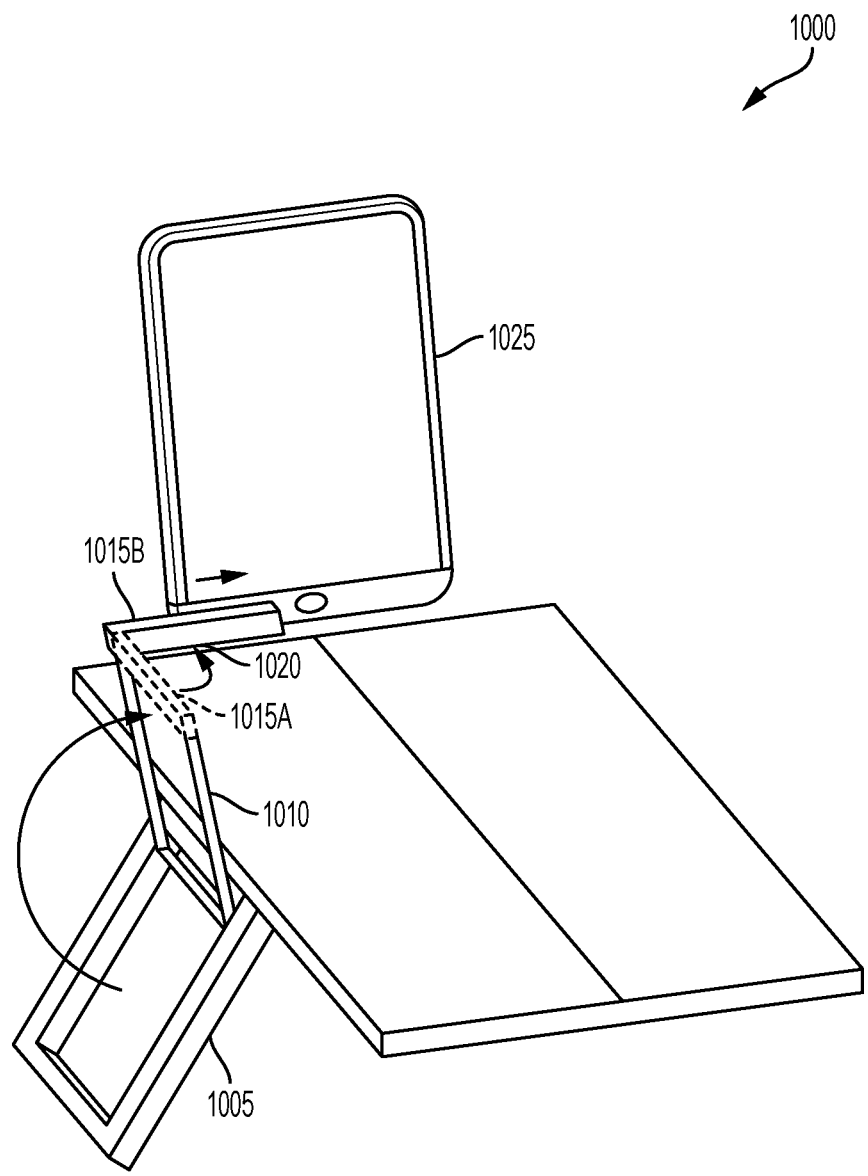
FIG. 10 depicts an exemplary PED holder tray table illustrating a PED holder using a tray table support arm.

FIG. 10 depicts a perspective view of an exemplary PED holder tray table 1000 illustrating a PED holder 1010 connected to a tray table support arm 1005. The tray table support arm 1005, in stowed position, nests against the tray table support arm 1005 and hingedly deploys therefrom. The PED holder 1010 includes a support member portion hingedly connected to the tray table support arm 1005 as well as a PED holder member 1015. The PED holder member 1015 pivots from a stowed position illustrated as position 1015A off an upper horizontal edge of the support member portion, to a deployed position illustrated as position 1015B. In deployed position, the PED holder member 1015 releasably receives the PED 1025, for example within a groove or clamp mechanism. The PED holder member 1015, for example, may be designed in a similar fashion to the slot of the PED holder 710 of FIG. 7B or the groove 815 of the blade PED holder 810 of FIG. 8. For example, the PED holder member 1015 may include a curved or rectangular shaped receptacle including a PED retaining treatment to releasably retain the PED 1025.

In some implementations, the PED holder member 1015 is slidably engaged with an extension member 1020. The extension member 1020 may be configured to releasably couple to a PED 1025 in a manner described above in relation to the holder member 1015. The extension member 1020, for example, may nest within the holder member 1015 in stowed position 1015A and slideably extend from the holder member 1015 in the deployed position. In another example, the holder member 1015 may be releasably locked to the support member portion of the PED holder 1010 with a spring mechanism in compressed state such that, upon release of the lock (or detent), the spring actuates the extension member 1020 into extended position.

Figure 11A:
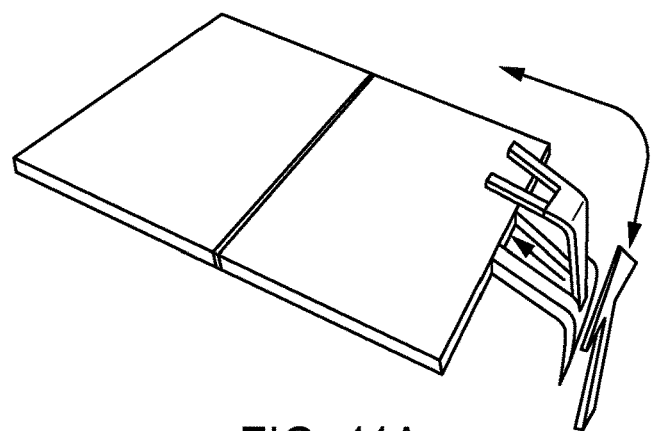
FIGS. 11A-11C depict an exemplary PED holder tray table with a slideable retention member.
Figure 11B:
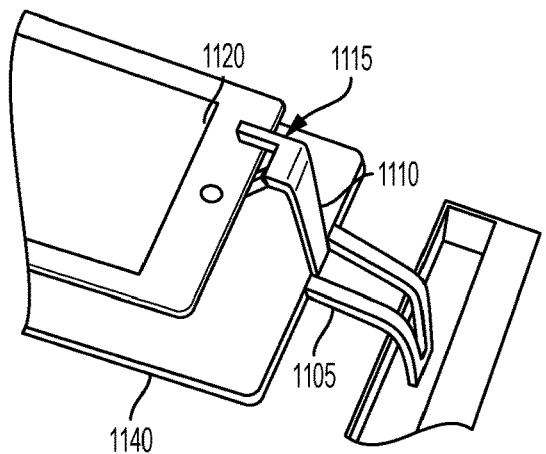
Figure 11C:
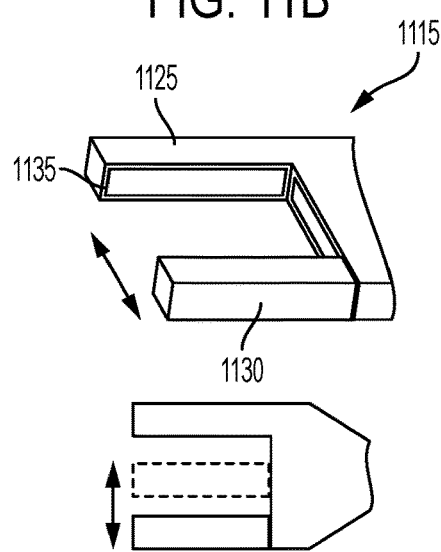

FIGS. 11A-C depict an exemplary PED holder tray table 1100 including an extending PED retention member 1110. As illustrated in FIG. 11A, tray table support arm 1105 is slidably coupled to the extending PED retention member 1110. The extending PED retention member 1110 includes a PED support jaw 1115. The PED support jaw 1115 receives a PED 1120, as illustrated in FIG. 11B, when in deployed position (e.g., at an upper edge of the tray table support arm 1105 abutting an edge of a table section 1140). For example, the PED support jaw 1115 retains a vertical edge of the PED 1120 while a horizontal edge rests against a surface of the table section 1140.

In some embodiments, the PED support jaw 1115 includes a fixed member 1125 and a moving member 1130 (e.g., mandible). The moving member 1130, in some embodiments, slides toward the fixed member 1125, gripping the edge of the PED 1120. Inner surfaces of one or both of the fixed member 1125 and the moving member 1130 may include a protective surface finish 1135 to avoid scratching or damaging the PED 1120. In some examples, the protective surface finish may be made of rubber, foam, or fabric.

In some embodiments, to provide angled support, the PED support jaw 1115 is pivotally connected to an arm portion of the PED retention member 1110. For example, the PED support jaw 1115 may be designed to provide at least 15 degrees of rotation away from the passenger, at least 30 degrees of rotation, or up to 45 degrees of rotation.

To further support the PED 1120 while held by the retention member 1110, in some embodiments, the table section 1140 includes a retention surface treatment, such as the surface treatments described in relation to FIG. 2B.

Figure 12A:
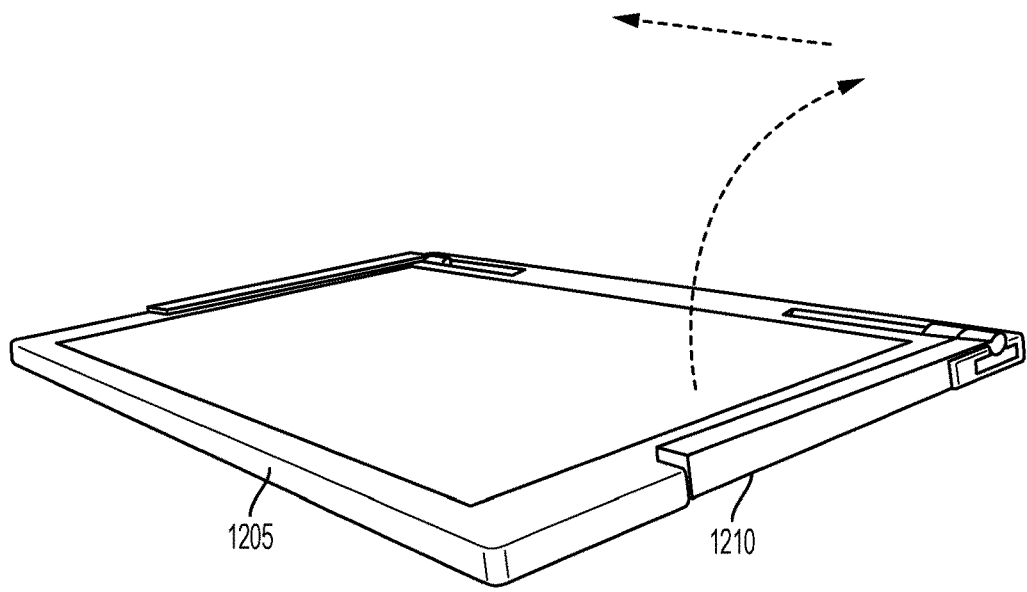
FIGS. 12A-12C depict an exemplary PED holder tray table with side-stowed backrests.
Figure 12B:
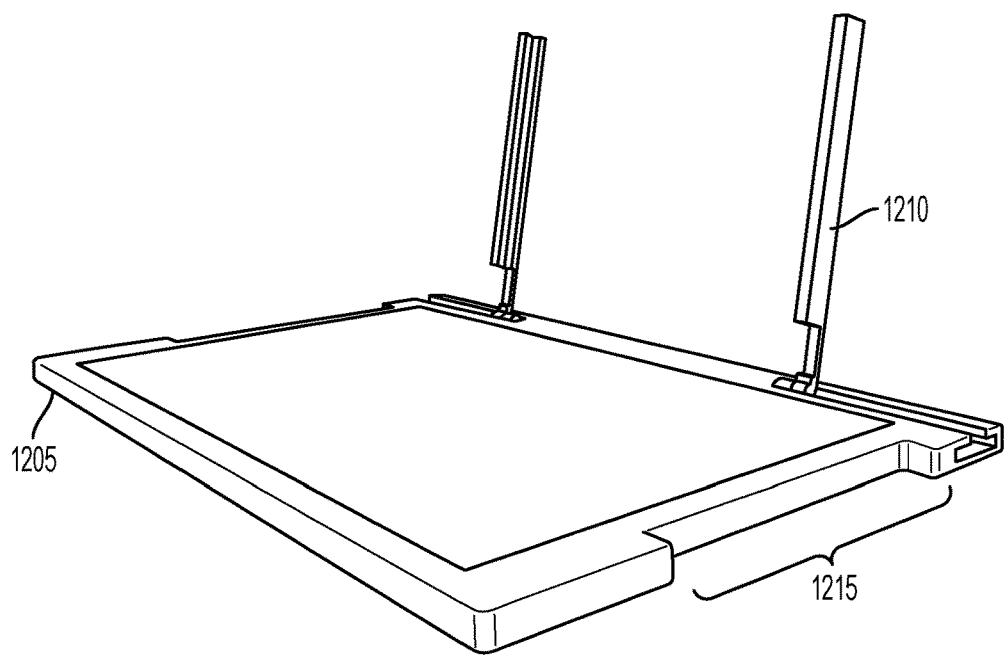
Figure 12C:
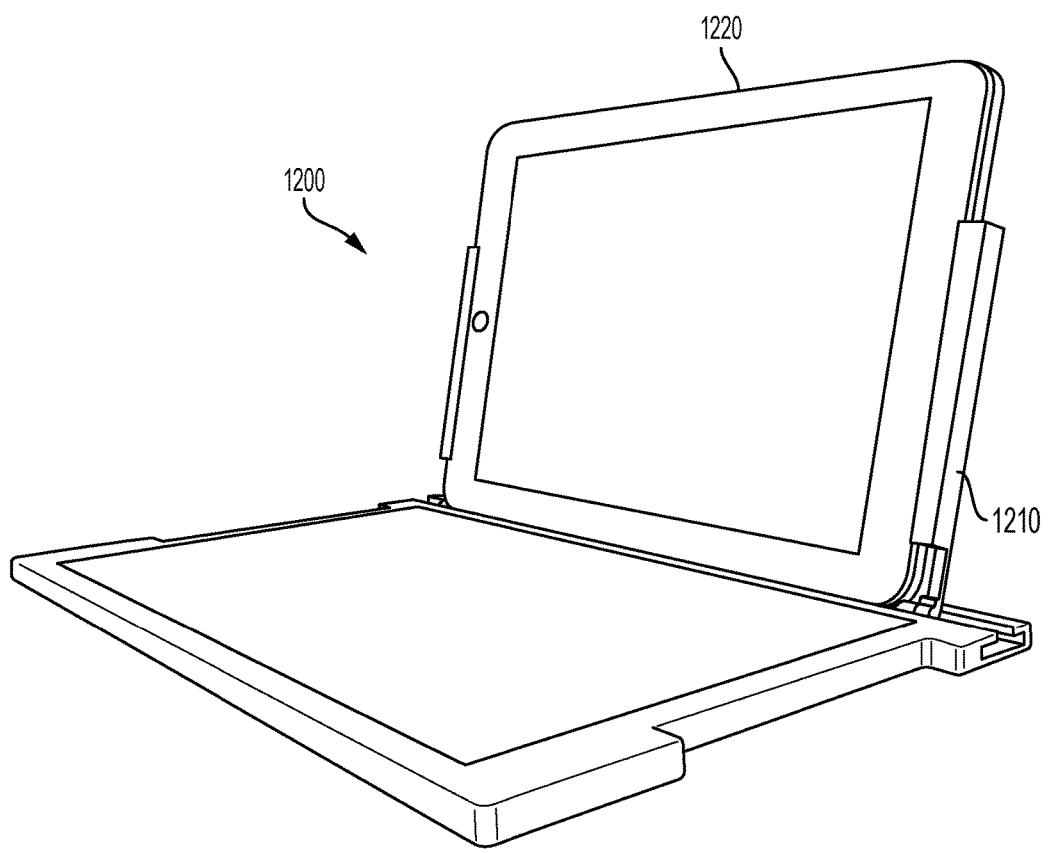

FIGS. 12A through 12C depict an exemplary PED holder tray table 1200 illustrating side-stowed backrests 1210. As illustrated in FIG. 12A, a pair of backrest support members 1210 are pivotably connected to opposing vertical edges of a tray table section 1205. In the stowed position, the backrest support members 1210 may align substantially flush with the respective edges of the tray table section 1205. Turning to FIG. 12B, when deployed, each backrest support member 1210 hinges upward to a vertical position extending perpendicularly from the opposing edges of the tray table section 1205. The backrest support members 1210 may then slide backward, away from a passenger along a track or groove in the tray table section 1205 and around a respective corner to align with a back edge of the tray table section 1205. Conversely, to stow the backrest support members 1210 from the deployed position, the backrest support members 1210 may slide outward along the rear edge of the tray table section 1205, around the corner, and hinge downward to align flush with the opposing vertical edges of the tray table section 1205.

As illustrated, the backrest support members 1210 create a section of the vertical edges of the tray table section 1205 such that, upon deployment, the sections of the edges where the backrest support members 1210 were stowed are open (e.g., forming a substantially rectangular cut-out 1215). To retain the backrest support members 1210 in this position, in some implementations, a protrusion (e.g., within the "cut-out" 1215 of the edge of the tray table section 1205) may releasably mate with a corresponding indent in the free end of the backrest support member 1210, or vice-versa. In other implementations, rather than the cut-out 1215, the vertical opposing edges of the tray table section 1205 may be designed with side pockets designed to releasably receive the backrest support members 1210.

Turning to FIG. 12C, in some implementations, the backrest support members 1210 include incorporated grooves which, in the deployed position face each other to releasably receive edges of a PED 1220. The grooves may include a retention surface treatment or protective treatment to retain the PED 1220 and/or avoid scratching or otherwise damaging the PED 1220, as described in greater detail above in relation to FIGS. 2B and 11C. In some embodiments, the backrest support members 1210 may be biased toward each other (e.g., spring bias or otherwise tension biased) to releasably receive PEDs of various dimensions.

Figure 13A:
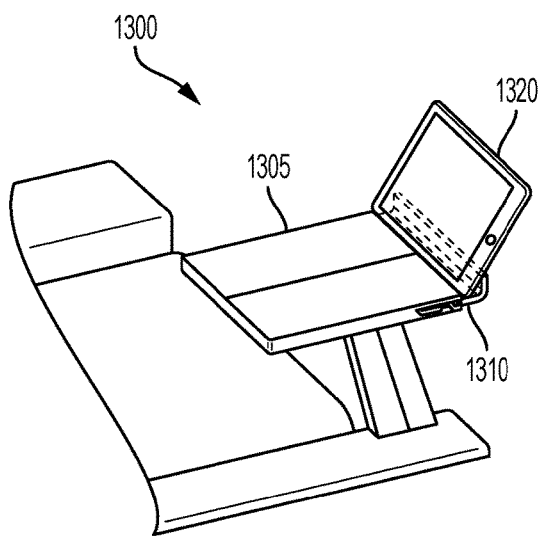
FIGS. 13A-13D depict an exemplary PED holder tray table with an off center rotational pivot for deploying a PED backrest.
Figure 13B:
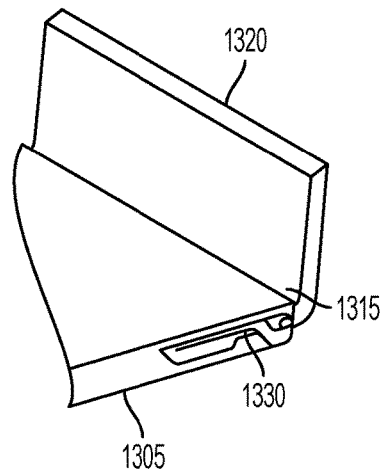
Figure 13C:
Figure 13D:
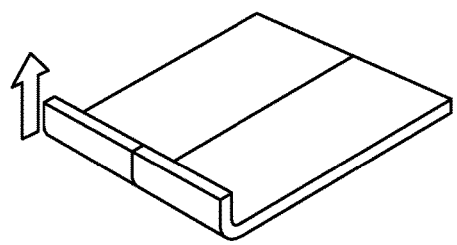

FIGS. 13A-D depict an exemplary PED holder tray table 1300 with an off-center rotational pivot mechanism 1310 designed to clear the edge of the table section 1305 while deploying and stowing a support surface 1320. As illustrated in FIG. 13B, a groove 1315 may be created between the edge of the table section 1305 and the support surface 1320 when the support surface 1320 is deployed. Upon stowing, the support surface 1320 may be maintained within the table section 1305 at a substantially horizontal position (e.g., in a plane parallel to a surface of the table section 1305), while, in the deployed position, the support surface 1320 may be substantially perpendicular to a plane parallel to the surface of the table section 1305 (e.g., as illustrated in FIG. 13C). As illustrated in FIG. 13A, a PED 1325 may be set in the groove and rest against the support surface 1320. To deploy the support surface 1320, for example, the passenger may push forwards (e.g., away from the passenger) against a tab 1330 extending from the off-center rotational pivot mechanism 1310. FIG. 13D illustrates a rear view of the support surface 1320 in deployed position.

In some implementations, the support surface 1320 may extend across the width of both table sections 1305 of a bi-folding tray table. For example, an extension section of the tray table 1300 may be adjacent the table section 805. In an illustrative embodiment, the extension portion may be clear of the vertical support surface 1320, which may advantageously provide the passenger or a crew member unobstructed access to a region around the extension portion (e.g., for use with a meal tray, laptop computer, newspaper, etc.).

Figure 14A:
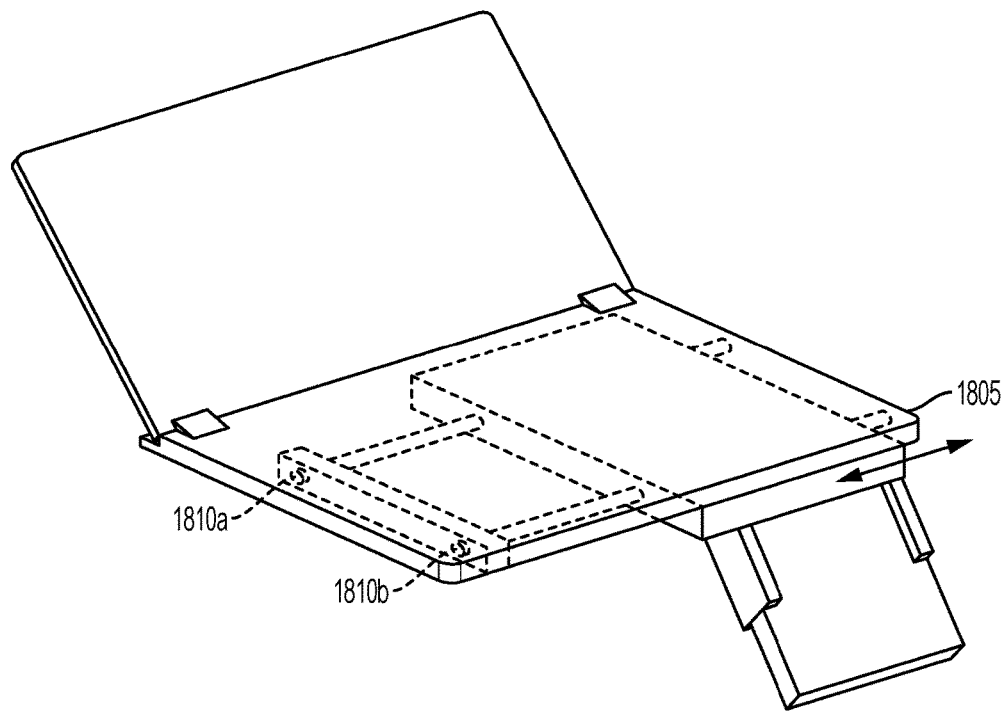
FIGS. 14A-14B depict an exemplary automatically extendable/retractable PED holder.
Figure 14B:
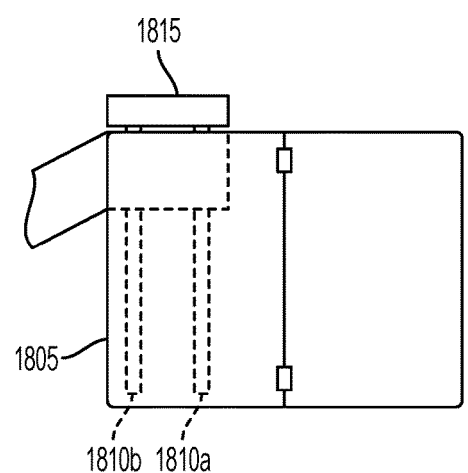

FIGS. 14A and 14B depict an exemplary tray table 1800 having a longitudinal sliding arrangement which may be provided by a pair of slide members 1810 coupled to a table section 1805. In some embodiments, the slide members 1810 are coupled to a bottom surface of the table section 1805. In other embodiments, the slide members 1810 are embedded in a pocket of the table section 1805, between an upper surface and a lower surface.

In response to longitudinal displacement of the tray table, a PED holder may be automatically deployed or stowed, depending on the direction of the motion. For example, if a passenger pulls the tray table toward his or herself, a linkage module (not shown) may automatically deploy (e.g., pivot up) a PED holder 1815, illustrated in FIG. 14B, from a stowed state under or within the table section 1805. Conversely, when the passenger pushes the tray table 1800 away from himself or herself, the linkage module may automatically retract the PED holder 1815 back to the stowed state under or within the table section 1805. In some embodiments, merely pushing the tray table away while a PED is held would potentially drop the PED from the table by uncontrolled withdrawal of support. Accordingly, some embodiments may include a sensor-based electronic or trigger-based mechanical interlock, such as a safety catch, that prevents retraction while a PED is being supported by the PED holder 1815. Once the PED is removed by the passenger, because the tray that has already been pushed forward, the linkage module may automatically cause retraction of the PED holder 1815 to the stowed state. In some implementations, a slow actuation may be effected to prevent aggressive snap-back, for example, by employing a damping element to provide dynamic resistance to a spring-biased return motion.

Figure 15A:
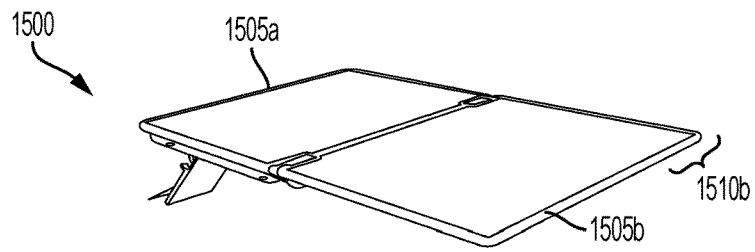
FIGS. 15A-15D depict an exemplary PED holder tray table with a kick-up backrest.

FIGS. 15A-D depict an exemplary PED holder tray table 1500 with a kick-up backrest section 1510 hingedly coupled to at least one table section 1505. As shown in FIG. 15A, the backrest section(s) 1510 are presented in a stowed position beneath the table section(s) 1505. In some embodiments, the backrest section(s) 1510 are substantially flush with a bottom surface of the table section(s) 1505. For example, the bottom surface(s) of the table section(s) 1505 may include a depression for receiving the backrest section(s) 1510. The backrest section(s) 1510, for example, may snap into place, for example against mating surfaces upon the lower surface(s) of the table section(s) 1505. In another example, the backrest section(s) 1510 may be biased against the lower surface(s) of the table section(s) 1505, for example using a spring hinge connection.

Figure 15B:
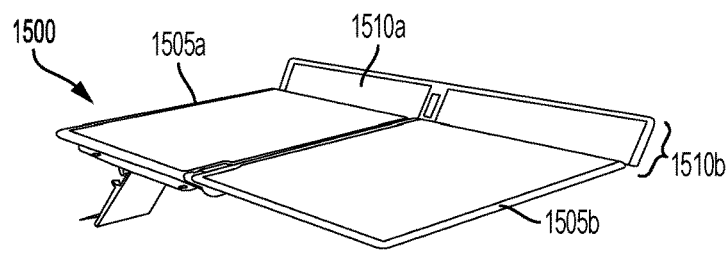

Turning to FIG. 15B, the backrest sections 1510a and 1510b are illustrated in deployed position, tilted upward behind a horizontal plane of the table sections 1505 and separated from an upper edge of the table sections 1505 by the span of a connecting hinge (e.g., hingedly coupled to a lower edge of the table sections 1505. The hinge, for example, may be one or more detent hinges per backrest section 1510 designed to support a static load of at least a tablet computer. For example, the hinge(s) may be designed to support at least a 2-pound static load, a 3-pound static load, a 5-pound static load, or up to a 10-pound static load. Additionally, the hinge(s) may be designed to resist dynamic loads caused by passenger interaction with a PED, jostling of the PED due to turbulence, etc. The hinge, in some examples, may be designed to support a PED at an angle of at least 15 degrees from vertical, about 20 degrees from vertical, about 30 degrees from vertical, or over 30 degrees from vertical.

Figure 15C:
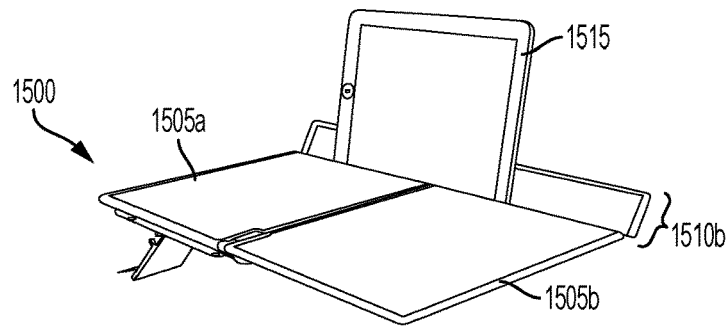

As illustrated in FIG. 15C, in some embodiments, a PED 1515 rests against the deployed backrest sections 1510 at a level below a surface of the table sections 1505. For example, the table edge and the backrest sections 1510 may create a substantially "v"-shaped pocket for receiving the PED 1515. depicts a perspective view of an exemplary PED holder tray table employed with a kick-up backrest section. The tray table 1505 is hingedly coupled to a kick-up backrest 1510C. A PED 1515 is placed in the kick-up section 1510C.

Figure 15D:
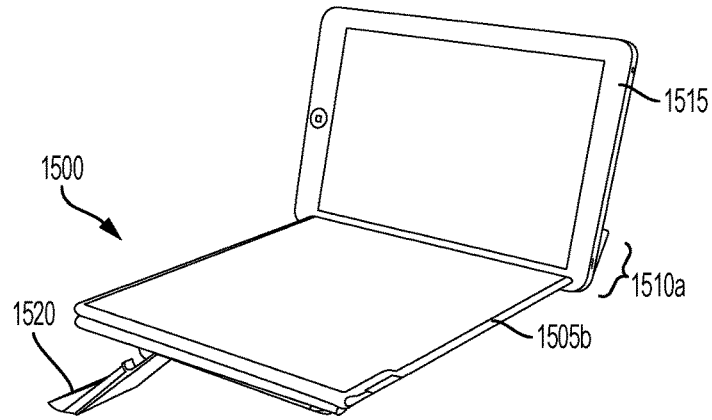

In some embodiments, the backrest section 1505a is still deployable and usable as a PED holder when table section 1505b is folded atop table section 1505a. Turning to FIG. 15D, the backrest section 1510a is positioned in the deployed state while the tray table 1500 is in folded position, allowing the PED 1515 to rest between the backrest section 1510a and the combined edges of tray table sections 1505a and 1505b.

Figure 16A:
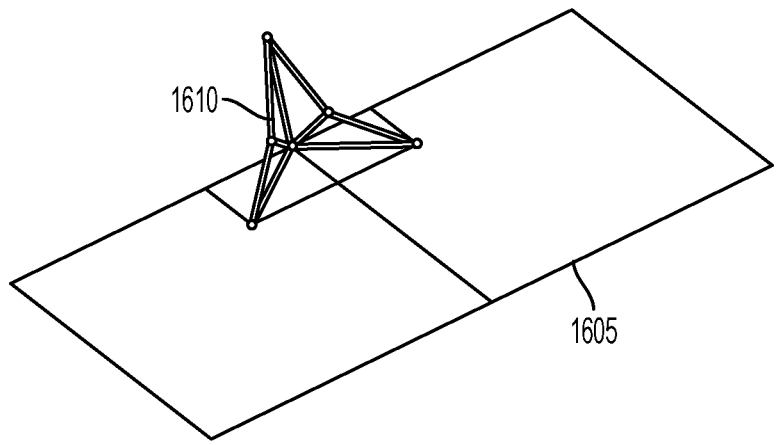
FIGS. 16A-16C depicts an exemplary PED holder tray table with an origami-style backrest.
Figure 16B:
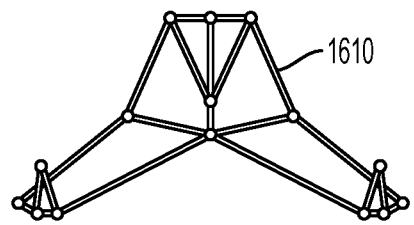
Figure 16C:
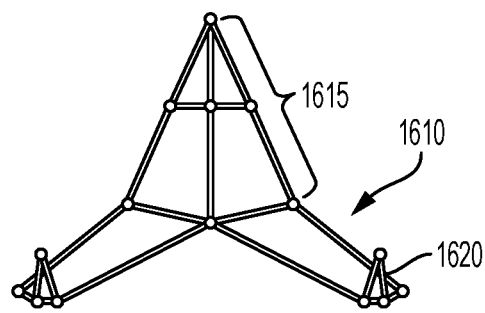

FIGS. 16A-C depicts an exemplary PED holder tray table 1600 with an origami-style backrest. Turning to FIG. 16A, a bi-fold tray table 1605 in extended position is selectively coupled to an origami PED backrest 1610. The origami PED backrest 1610 pops up when the tray table 1605 is unfolded. The origami PED backrest 1610, for example, may be configured as a network of hinged linkages designed to unfold in the manner of an origami stand. In another example, the origami PED backrest 1610 may be designed using a polymer material with hinges or flexible connectors allowing for unfolding the backrest.

FIG. 16B depicts a perspective view of a model of an origami-style backrest. The origami backrest 1610 is shown folding forward as it would when the tray table is folded.

FIG. 16C depicts a perspective view of an exemplary origami-style backrest. The origami backrest 1610 includes a backrest portion 1615 and a foot holder portion 1620.

Figure 17A:
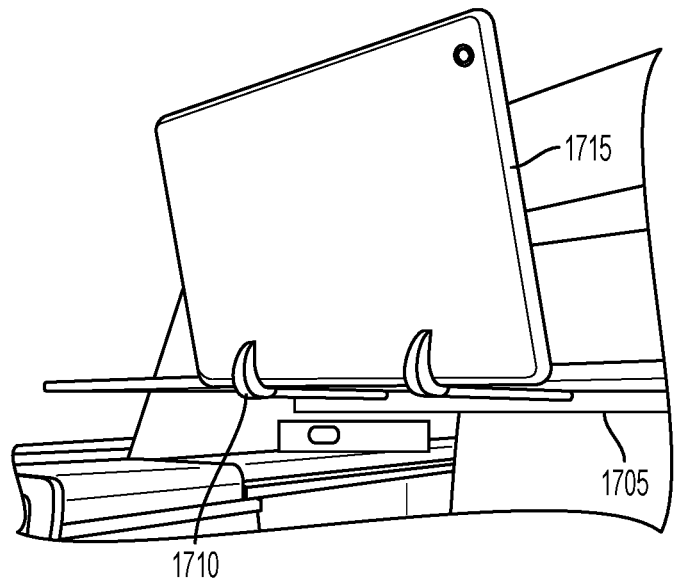
FIGS. 17A-17B depict an exemplary PED holder employing pullout rotating claws.

FIG. 17A depicts a perspective view of an exemplary PED holder with pullout rotating claw members. A tray table 1705 is rotatably coupled to individual claw members 1710 (illustrated as two claw members). The claw members 1710 support a PED 1715.

Figure 17B:
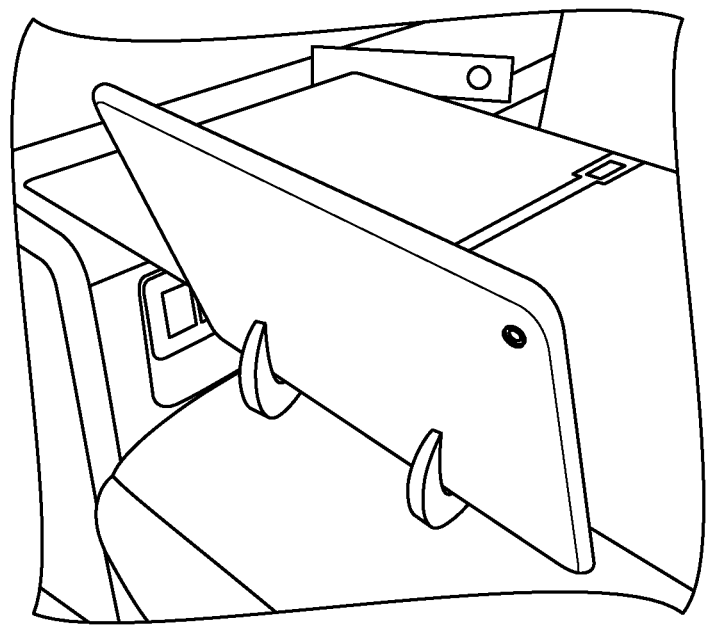

FIG. 17B depicts a perspective view of the tray table 1705 with claw members 1710. The claw members 1710, for example, may rotate by 90 degrees (same or opposing direction per claw member 1710) and pivotally stow against a bottom surface of the tray table 1705. In some implementations, each claw member 1710 is fixed to a rotating extendable shaft coupled to the underside of the tray table 1705 or disposed in an internal pocket of the tray table 1705. Using the rotating shafts, for example, each claw member 1710 may be rotated out of stowed position and pulled away from the seated passenger to extend beyond an edge of the tray table 1705. The extendable rotating shafts may be coupled, in one example, such that deployment of the claw members 1710 is simultaneously achieved through a single articulation effort. Deployment may be manual or aided by a control (e.g., rotating knob, push button, etc.).

While certain embodiments have been described, these embodiments have been presented by way of example only, and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:

1. A tray table with an integrated personal electronic device (PED) holder apparatus, the tray table comprising:
a first tray section hingedly connected to a second tray section along a first side edge of the second tray section such that, in a first operational mode, the second tray section is folded on top of the first tray section with a first surface of the second tray section directed upward, and in a second operational mode, the second tray section is in line with the first tray section with the first surface of the second tray section directed downward;
a personal electronic device (PED) support member hingedly connected to the second tray section along a second side edge of the second tray section perpendicular to the first side edge, wherein,
in a stowed position, the PED support member is substantially flush with the first surface of the second tray section,
in a first deployed position corresponding to the first operational mode, the PED support member extends from the second tray section at a first deployment angle relative to the first surface of the second tray section,
in a second deployed position corresponding to the second operational mode, the PED support member extends from the second tray section at a second deployment angle relative to a second surface of the second tray section opposite the first surface; and
wherein the PED support member is extendable from the stowed position in an interior of the second tray section, whereby the PED support member when stowed is substantially encased between the first surface of the second tray section and a lower surface of the second tray section.

2. The tray table of claim 1, wherein the PED support member, in the stowed position, comprises a portion of a passenger-facing surface of the second tray section in the first operational mode.

3. The tray table of claim 2, wherein, to deploy the PED support member, a passenger reaches into a finger depression to pull up on an edge of the PED support member, wherein the finger depression is positioned within a substantially planar passenger-facing surface of the second tray section.

4. The tray table of claim 1, wherein the PED support member is connected to a vertical edge of the second tray section using a friction hinge having a range of motion of at least 270 degrees such that, in the second operational mode, the PED support member deploys by rotating downward and around to the second deployment angle.

5. The tray table of claim 1, wherein the first deployment angle of the PED support member is universally selectable within a deployment range of at least 45 degrees relative to the first surface of the second tray section.

6. The tray table of claim 1, wherein the PED support member, in both the first operational mode and second operational mode, is pivotable relative to the second tray section.

7. The tray table of claim 1, wherein the PED support member comprises a non-slip surface treatment to frictionally retain the personal electronic device.

* * * * *